United States Patent [19]

Bartz

[11] Patent Number: 4,969,571
[45] Date of Patent: Nov. 13, 1990

[54] CONTEINER FOR FLUIDS

[75] Inventor: Richard O. Bartz, Edina, Minn.

[73] Assignee: Innovative Technology Inc., Minneapolis, Minn.

[21] Appl. No.: 434,265

[22] Filed: Nov. 13, 1989

Related U.S. Application Data

[63] Continuation-in-part of Ser. No. 206,313, Jun. 14, 1988, Pat. No. 4,881,650.

[51] Int. Cl.$^5$ .............................................. B65D 23/10
[52] U.S. Cl. ................................. 220/94 A; 215/1 C; 220/1 C
[58] Field of Search .............. 220/1 C, 94 A; 215/1 C

[56] References Cited

U.S. PATENT DOCUMENTS

| | | |
|---|---|---|
| D. 282,957 | 3/1986 | Carlson . |
| 1,331,409 | 2/1920 | Barnett . |
| 1,506,028 | 8/1924 | Perritt . |
| 1,568,830 | 1/1926 | Gunderson . |
| 3,195,752 | 7/1965 | Cox . |
| 3,325,031 | 6/1967 | Singier ................................. 215/1 C |
| 3,746,200 | 7/1973 | Flider . |
| 3,765,574 | 10/1973 | Urquiza ................................. 215/1 C |
| 3,831,805 | 8/1974 | Yonce ................................. 220/94 A |
| 3,927,797 | 12/1975 | Flider ........................... 220/94 A X |
| 4,125,207 | 11/1978 | Ernst et al. ........................... 215/1 C |
| 4,579,260 | 4/1986 | Young et al. ................... 215/1 C X |
| 4,658,975 | 4/1987 | Cone . |
| 4,804,119 | 2/1989 | Goodall ........................... 225/1 C X |
| 4,881,650 | 11/1989 | Bartz ................................... 220/1 C |

FOREIGN PATENT DOCUMENTS 1465560 11/1965 France .
110547 1/1965 Netherlands .

Primary Examiner—Steven M. Pollard

[57] ABSTRACT

A container for storing liquid and liquid-like materials having a pair of handles oriented relative to each other to facilitate manual handling of the container. The container having front and back walls joined to bottom, top, and side walls forming an enclosed chamber for storing liquid. The top wall has a pouring spout and a first handle located in the longitudinal plane of the container. The front and back walls have laterally spaced corner sections joined to a transverse second handle. A recess extended under the second handle is open to the bottom wall and the side wall to allow the second handle to be gripped from either the bottom or the side.

20 Claims, 4 Drawing Sheets

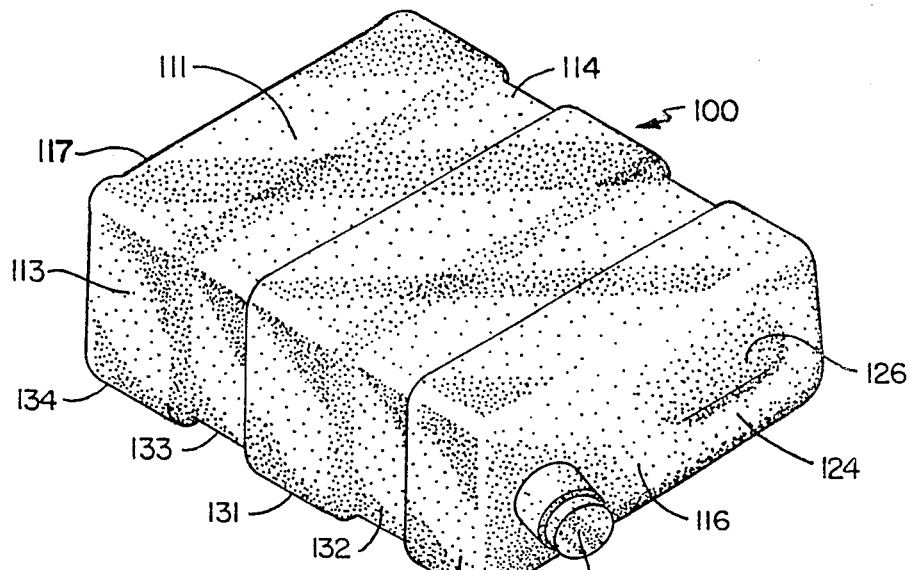
Fig. 10
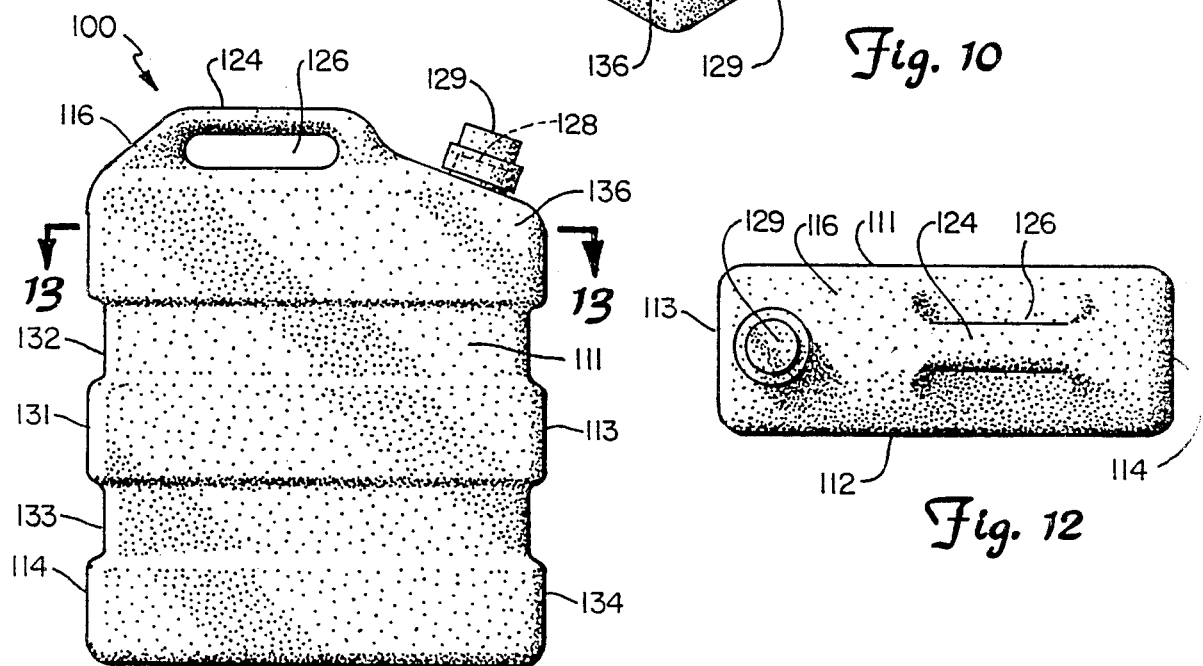
Fig. 11
Fig. 12
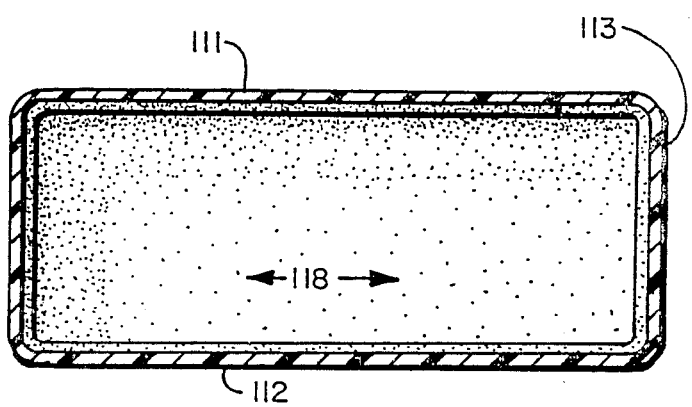
Fig. 13

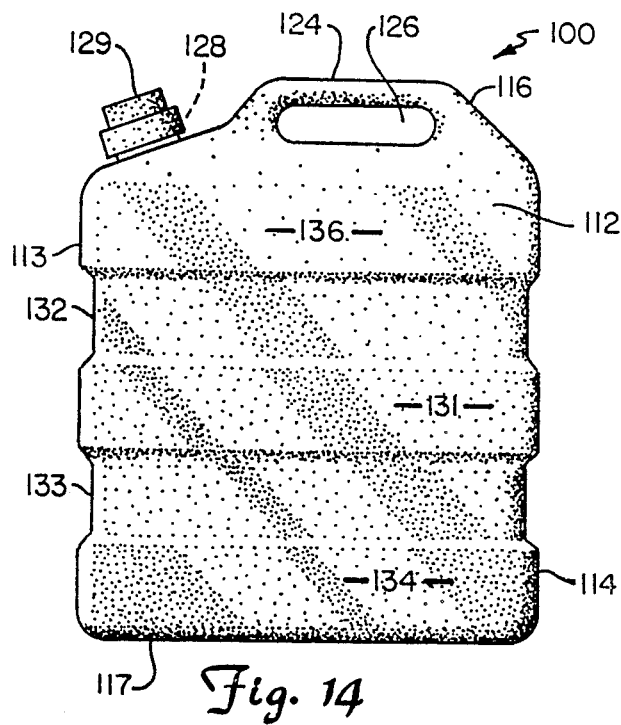
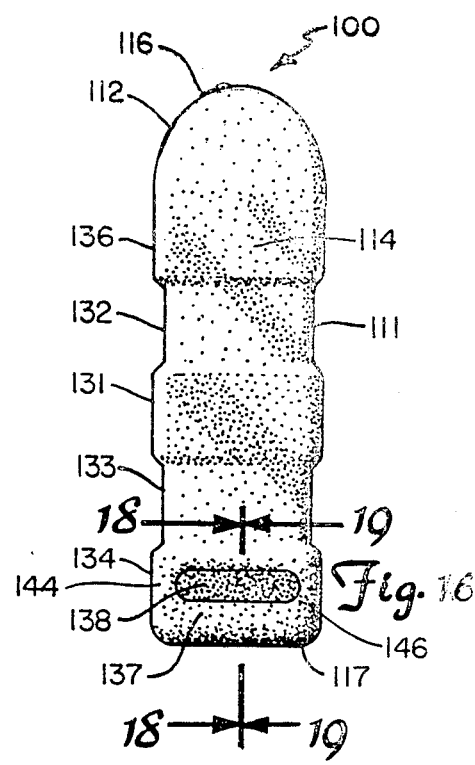
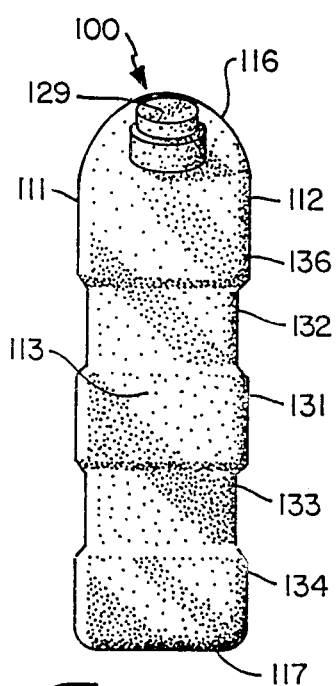
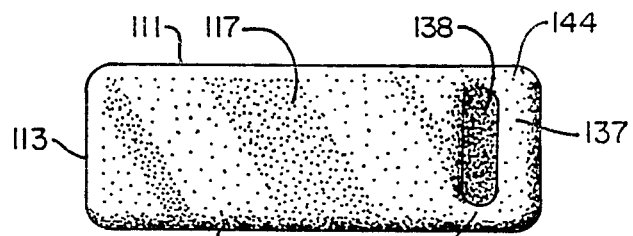
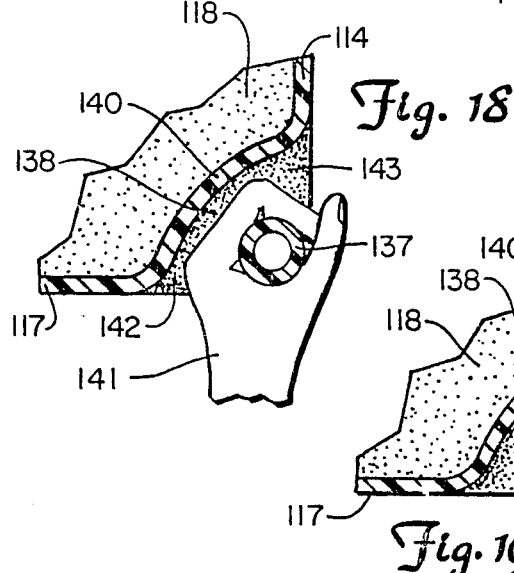
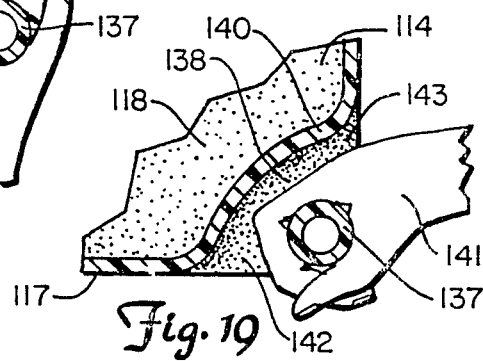

CONTAINER FOR FLUIDS

CROSS REFERENCE TO RELATED APPLICATION

This application is a continuation-in-part of U.S. application Ser. No. 206,313 filed June 14, 1988, now U.S. Pat. No. 4,881,650.

FIELD OF INVENTION

The invention is in the field of containers for storing liquids that can be manually carried and turned to pour liquids from the container. One form of the container is a drain pan for collecting and storing used motor oil so that the oil can be recycled or utilized in an environmentally compatible manner.

BACKGROUND OF THE INVENTION

Numerous liquids are transported and stored in containers having handles to aid in carrying the containers. Handles joined to the top and/or side of the containers are used to carry the containers and pour liquid out the containers.

It is common practice to use drain pans and open top basins for collecting oil being drained from internal combustion engines of motor vehicles. At least half of the car owners change the lubricating oil in their vehicles themselves at least once a year. A small percentage, no more than 15 percent, of the drain oil is recovered for reuse as lubricant or fuel. Most of the oil is disposed of into the environment as a pollutant. For example, for many years used motor oil was spread on dirt and graveled driveways and roads to reduce airborne dust and dirt. Environmental concerns have resulted in legislation that requires the used motor oil to be collected at disposal stations for appropriate use with minimum harm to the environment.

Oil collection and storage containers for oil that is drained from a motor vehicle are known. These containers have a single handle on the top wall thereof to facilitate the carrying of the container. An example of this type of container is shown in U.S. Pat. No. Re. 27,449, which issued to R. O. Bartz on Aug. 2, 1972. The single handle on the top of the container is not readily usable to pour the oil out of the pouring spout of the container. The user must grab the lower end of the container and tilt the container upwardly so that oil can run out of the pouring spout. This procedure is awkward and prone to slippage as there is no positive grip of the hands on the lower portion of the container. The container of the invention has overcome these disadvantages of prior drain pans for collecting drain oil from motor vehicles.

SUMMARY OF INVENTION

The invention is directed to a container for storing liquid and liquid-like materials having a pair of handles orientated relative to each other to facilitate manual handling of the container. The container has front and back walls joined to bottom and top walls and side walls forming an enclosed chamber for storing liquid. The top wall has a pouring spout and a first handle located in the longitudinal plane of the container. The front and back walls have laterally spaced corner sections joined to a transverse second handle. A recess extended under the second handle is open to the bottom wall and a side wall to allow the second handle to be gripped from either the bottom or the side. The second handle is normally disposed relative to the first handle and located generally diagonally opposite the spout.

One form of the invention is an apparatus for collecting and storing liquid drained from a machine, such as a motor vehicle, to facilitate the collection of the liquids and their proper disposal with a minimum harm to the environment. The apparatus is a container having an internal chamber for accommodating the liquid that is drained from the vehicle. The internal chamber is surrounded by first and second side walls, a bottom wall, and first and second end walls that are joined to a top wall. The bottom wall supports the container in a prone position, so that it can be moved under the vehicle in an appropriate position to receive the liquid that is drained from the vehicle. The first end wall is normally disposed relative to the bottom wall so that the container can be supported in an upright position with the liquid stored in the chamber. A handle on the second end wall was used to transport the container in its upright position and aid in pouring liquid from the container. The top wall has an inwardly directed funnel-shaped section with a lower most portion thereof having an opening in communication with the chamber so that when liquid is drained onto the funnel-shaped section, it flows through the opening into the chamber. The second end wall has a pouring spout with as second opening that is normally closed with removable cap. A second handle is secured to the container adjacent the first end wall and second side wall in a corner that is diagonally opposite the pouring spout. The first and second handles are adapted to be hand-gripped to facilitate the pouring of the liquid from the chamber through the spout into an appropriate liquid disposal station.

One preferred embodiment of the container has first and second side walls joined to a bottom wall for supporting the container in a prone position to collect liquid that is being drained from a motor vehicle. The side walls and bottom walls have a plurality of transverse ribs that are separated with transverse grooves to provide a durable and strong wall structure. The first or lower end wall is normally disposed relative to the bottom wall so that the container can be supported in an upright position to store the liquid in the chamber. The opposite end of the container has a second end wall that is joined to the side walls and top and bottom walls to completely enclose the chamber. The top wall has an upright outer peripheral ridge that surrounds a generally rectangular, funnel-shaped pan. The ridge forms side walls for the pan to prevent overflow of liquid and reduce the splashing of the liquid out of the funnel-shaped pan of the container. The funnel-shaped pan of the container has in inwardly and downwardly sloping wall with a lower most portion thereof located in close proximity with respect to the second end wall. This allows the container to be positioned in its upright position with the level of the liquid in the chamber below the opening in the lower most portion of the pan. The second or upper wall of the container has the pouring spout which has the opening that is normally closed with a removable cap. A first handle is located in a transverse position adjacent to the second end wall and is secured thereto to facilitate the carrying of the container in its upright position. A second handle is secured to the top and bottom walls of the container adjacent the second side wall or the side wall that is opposite the side wall that is adjacent the pouring spout. Thus, the second handle is diagonally disposed across the container relative to the pouring spout. The first handle is normally disposed relative to the second handle, so that the second handle can be conveniently gripped with a hand of a person while the other hand of the person holds the upper end of the container to positively manipulate the container to facilitate the pouring of the liquid from the chamber out through the spout at an appropriate liquid disposal station.

DESCRIPTION OF DRAWING

FIG. 10 is a prospective view of a modification of the fluid container of the invention;

FIG. 11 is a side elevational view of the container of FIG. 10;

FIG. 12 is a top plan view of FIG. 10;

FIG. 13 is an enlarged sectional view taken along the line 13—13 of FIG. 11;

FIG. 14 is a side elevational view of the side opposite of the container of FIG. 10;

FIG. 15 is an elevational view of the spout side of the container of FIG. 10;

FIG. 16 is an elevational view of the handle side of the container of FIG. 10;

FIG. 17 is a plan view of the lower end of the container of FIG. 10;

FIG. 18 is an enlarged sectional view taken along the line 18—18 illustrating a hand gripping the handle from the lower end thereof; and FIG. 19 is an enlarged sectional view taken along the line 19—19 of FIG. 16 showing a hand gripping the handle from the side thereof.

DESCRIPTION OF PREFERRED EMBODIMENTS

Figure 1:
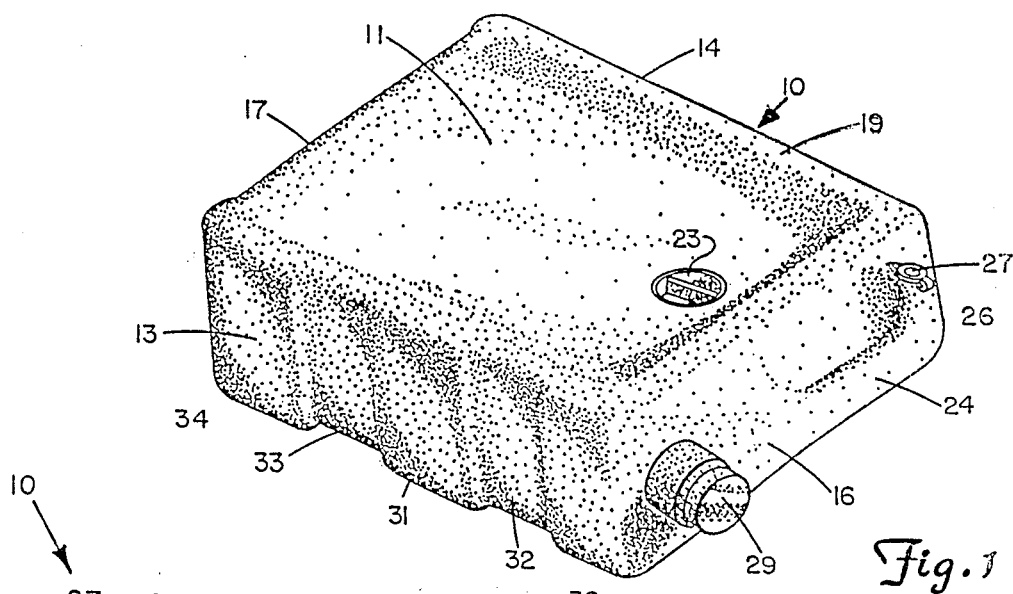
FIG. 1 is a perspective view of the fluid collection container of the invention.
Figure 2:
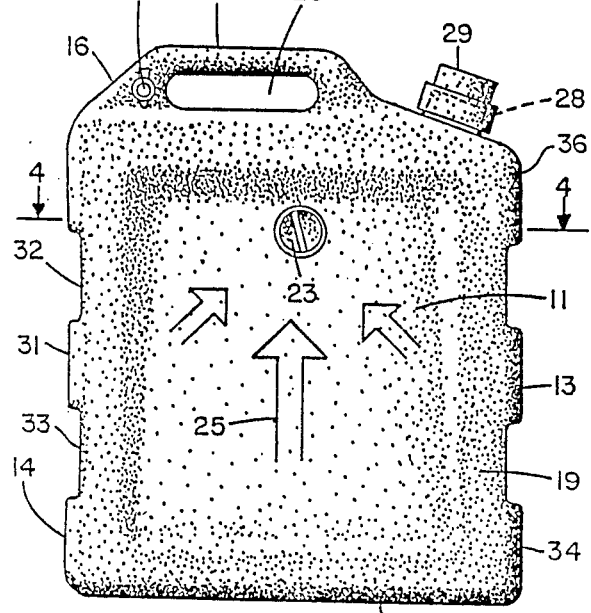
FIG. 2 is a top plan view of FIG. 1.
Figure 3:
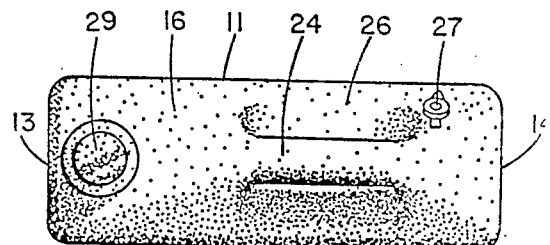
FIG. 3 is a plan view of the upper end of the fluid collection container.

Referring to FIGS. 1 to 3, there is shown the fluid collection container of the invention indicated generally at 10 for collecting motor vehicle fluids as they are drained from a motor vehicle such as an automobile, truck, tractor, motorcycles, and the like. The fluids are motor oil, antifreeze, radiator coolants, transmission oil and like fluids that are normally drained from an internal combustion engine radiator, transmission and the like and replaced with new fluids. Container 10 is also usable to collect liquids flowing from machines, tanks, and other means having liquids that are drained therefrom.

A substantial number of motor vehicle owners change their lubricating oil themselves by draining the oil from the crankcases and disposing of the oil. Only a small fraction of this oil is recovered for reuse as a lubricant. Most of it is disposed in ways that ultimately bring it into the environment as a pollutant. Millions of gallons of used lubricating oil are annually injected directly into the environment via landfills and other disposal methods. This oil may contain benzene, lead, and other toxic metals harmful to human health. One quart of oil can make 250,000 gallons of water undrinkable.

Container 10 of the invention provides a large-capacity container for collecting drain oil and transporting it to an appropriate disposal location. Container 10 can be manually carried and poured, as it has a top handle and a side/bottom handle usable to manually manipulate the container in a convenient manner to locate the container under a crankcase of a motor vehicle and subsequently pour the drain oil from the container into a disposal location, such as a tank or drum at a waste oil collection site.

Container 10 is a low-profile, generally rectangular can having a top wall 11 located over a bottom wall 12. Container 10 can have other shapes such as square, round or triangular. Side walls 13 and 14 and upper end wall 16 and lower end wall 17 are joined to the top and bottom walls 11 and 12 to enclose a chamber 18 that stores liquid, such as oil within the container. Chamber 18 has a liquid capacity of 12 or more quarts. Container 10 can have a larger or smaller liquid-storing capacity. Container 10 is molded of heavy-gauge polyethylene, such as high molecular weight polyethylene and like materials, that are chemically inert to oils, antifreeze and other vehicle fluids. The material of container 10 is strong and durable and does not deteriorate under normal temperature conditions.

Figure 4:
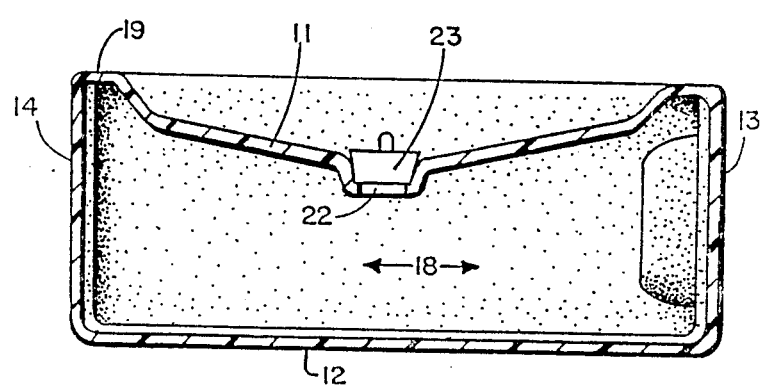
FIG. 4 is an enlarged sectional view taken along the line 4—4 of FIG. 2.

Referring to FIGS. 1, 2 and 4, container 10, when in a prone position, has a generally rectangular, upwardly directed ridge 19 extended around the entire outer peripheral edge of top wall 11. Ridge 19 has a generally convex shape and surrounds a funnel-shaped wall portion that slopes downwardly and inwardly from the lower end wall 17 toward the upper end wall 16. The top wall portion slopes downwardly and inwardly toward a downwardly projected sleeve 21 having an opening 22 into chamber 18. Opening 22 is located in close or contiguous relationship relative to upper end wall 16 so that when the container is placed in an upright position, opening 22 is in the upper portion of the container, thereby preventing the oil from flowing out of the container through opening 22. A generally cone-shaped plug 23 having a friction fit within sleeve 21 is used to close opening 22. Other types of caps or plugs can be used to close opening 22. When plug 23 is removed and the container is on its prone position, the oil that is directed onto top wall 11 will flow toward opening 22 as indicated by arrows 25 in FIG. 2. The upwardly directed ridge 19 surrounding the sloping top wall section provides top wall 11 with a large funnel-shaped pan which, in addition to directing oil flow to opening 22, prevents overflow of oil and reduces splashing of oil outwardly of container 10.

The upper end wall 16 has a first handle 24 extended over an elongated opening 26 to accommodate the hand of a person to carry the container. Handle 24 is parallel to the width of the container. As shown in FIG. 3, handle 24 is located in the middle horizontal plane of container 10 and aligned with a pouring spout 28 closed with a cap 29. An air-bleed device 27 is mounted on the upper end wall 16 to allow air to flow from the chamber 18 when oil is being drained into chamber 18. This prevents the bubbling and gurgling of the oil as it flows through opening 22 into chamber 18. Air-bleed device 27 has a snap cover that fits over a short, circular rib or annular button surrounding a hole into the chamber 18. The cover snaps on to the rib to close the hole therein. The cover is manually releasable from the rib to open the hole whereby air can flow from chamber 18. Other types of air-bleed structures can be used with the container, such as a push-pull open and closed valve.

Upper end wall 16 has a upwardly directed cylindrical pouring spout 28 located adjacent the right end of handle 24 and side wall 13 as shown in FIG. 2. A cup-shaped cap 29 is threaded onto spout 28 to close the opening of spout 28. Cap 29 is removed from spout 28 to allow the liquid in chamber 18 to be poured into a desired location, such as an appropriate oil disposal collection center.

Figure 5:
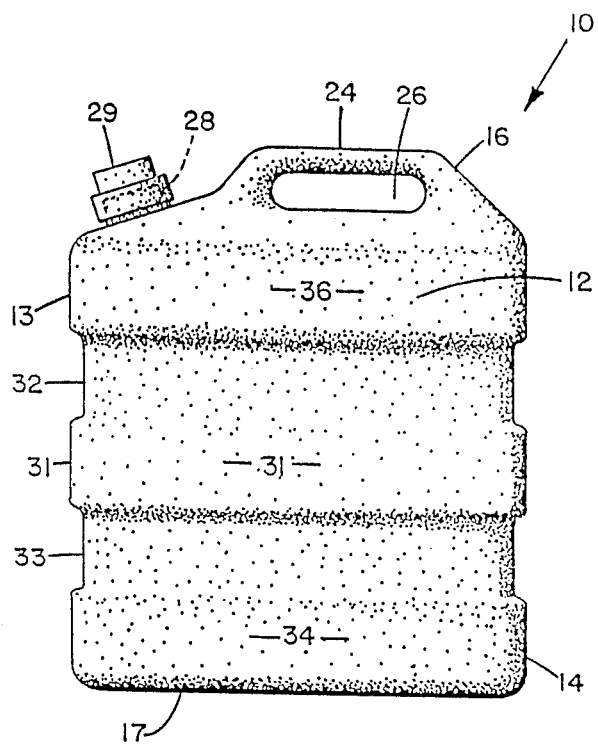
FIG. 5 is a bottom plan view of the fluid collection container.
Figure 7:
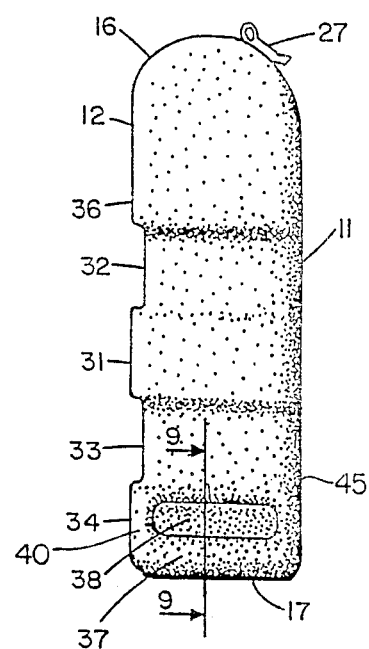
FIG. 7 is a side view of the right side of FIG. 5.
Figure 6:
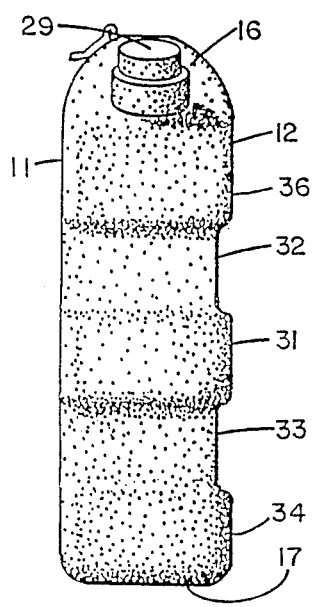
FIG. 6 is side view of the left side view of FIG. 5.

As shown in FIGS. 5, 6, and 7, the mid-section of container 10 has a generally flat, transverse rib or band 31. Band 31 extends upwardly inside side walls 13 and 14. Generally flat transverse grooves 32 and 33 are located on opposite sides of band 31. Grooves 32 and 33 separate the band 31 from generally flat bands or ribs 34 and 36. Rib 34 extends to bottom wall 17 and has ends that extend upwardly into side walls 13 and 14. Rib 36 joins with end wall 16 and has opposite ends that extend upwardly into side walls 13 and 14. Ribs 31, 34, and 36 strengthen and stabilize bottom wall 12 and side walls 13 and 14, minimize bulging and outward movement of the walls which may be caused by liquids and gases located within chamber 18 and pressure differences between chamber 18 and atmosphere.

Figure 8:
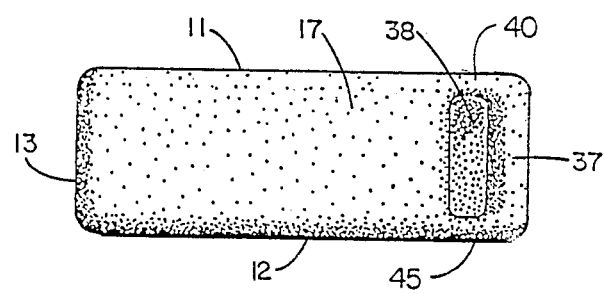
FIG. 8 is a plan view of the lower end of the fluid collection container.
Figure 9:
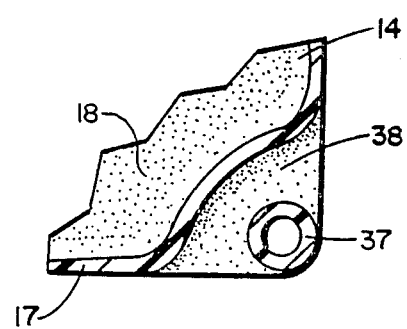
FIG. 9 is an enlarged sectional view taken along the line 9—9 of FIG. 7.

Referring to FIGS. 7, 8, and 9, the lower portion of container 10 adjacent side wall 12 and bottom wall 17 has a second elongated, generally cylindrical handle 37. Handle 37 is joined to the lower corners 40 and 45 of the top and bottom walls 12 and 11, respectively. The middle portion or span of handle 37 is spaced from side wall 14 as shown in FIG. 9 to provide an opening or recess 38 for accommodating the hand of a user. Lower corners 40 and 45 prevent the hand from slipping off handle 37. Handle 37 is located diagonally opposite spout 28 and extends normal to the transverse longitudinal extent of first handle 24. The middle longitudinal plane of container 10 that passes through handle 24 bisects handle 37.

Container 10 is used in the prone position, as shown in FIG. 1 to drain oil from internal combustion engine. Plug 23 is removed from sleeve 21, thereby opening hole 22. The air bleed device 27 is opened so that the air can flow out of chamber 18 when the oil flows into chamber 18 through hole 22. Container 10 is placed under the engine with bottom wall 12 in engagement with a support surface, such as a floor. Top wall 11 is placed under the engine drain plug which is removed from the oil pan, thereby allowing oil to flow onto top wall 11. The oil flows as indicated by the arrows 25 toward the hole 22 which directs the oil into chamber 18. After the oil has been drained from the engine, container 10 is pulled from under the engine by using handle 24. The plug 23 is placed back in the sleeve 21, thereby closing hole 22. The air bleed device 27 is snapped shut. Container 10 is set up in an upright position by use of handle 24. Handle 24 is also used to transport the container to a oil disposal location.

The oil is poured from container 10 by removing the cap 29 thereby opening the hole in spout 28. The user uses his/her hands in engagement with the first handle 24 and the second handle 37 to lift and tilt container 10 so that spout 28 is located above its oil receptacle. Container 10 can be conveniently held by the user until all of the oil is drained from chamber 18. The user has a positive grip with his/her hands on both handles 24 and 37 which precludes the slippage of the container from the user as well as inadvertent diversion of the oil as it is being poured from the container.

Referring to FIGS. 10 to 19, there is shown a modification of the container of the invention indicated generally at 100 having a pair of coordinated handles to facilitate the carrying handling of the container as herein described. Container 100 is a low-profile, generally rectangular can having an internal chamber 118 for storing fluid and fluid-like materials such as liquids, powders, granular materials and the like. The container can have other shapes such as square, round, triangular, hexagon and other enclosed structures. Container 100, as seen in FIGS. 10, 11, and 13, has a top wall 111 located over a bottom wall 112. Side walls 113 and 114 and upper end wall 116 and lower end wall 117 are joined to top and bottom walls 111 and 112 to enclose chamber 118. The size of container 100 can vary. For example, the container can have a liquid storing capacity of 12 or more quarts. Container 100 can have a larger or smaller liquid storing capacity. Container 100 is made from a material such as molded high molecular weight polyethylene and like plastic materials that are chemically inert to the fluids and fluid-like materials that are stored in chamber 118. Other types of plastics and other materials, such as metals, can be used for container 100. The selected materials have the characteristics of strength, durability, and do not deteriorate under normal temperature conditions nor react to the material stored in chamber 118.

Referring to FIGS. 11, 12 and 14, container 100 has an upper end wall 116 provided with a first handle 124 extended over an elongated opening 126 to accommodate a hand of a person to carry the container. The opposite ends of handle 124 are joined to top wall 116 thereby closing the opposite ends of opening 126. The hand that grips handle 124 cannot slip off the handle due to the connection of opposite portions of the handle to upper end wall 116. Handle 124 is parallel to the width of the container and located in a middle horizontal plane. The handle is aligned with a pouring spout 128 closed with a cap 129. Spout 128 is a cylindrical nipple or projection having external threads which cooperate with internal threads of cap 129 whereby the cap can be threaded onto spout 128 to close the pouring opening therein and removed from spout 129 so that the fluid in chamber 118 can be poured from container 100. Spout 128 is also used to fill chamber 118 with fluid and fluid-like materials. Spout 128 is locate in the upper corner of upper end wall 116 adjacent side wall 113. Spout 128 extends upwardly and outwardly at an angle of about 20 degrees to facilitate the pouring of the fluid from chamber 118.

As shown in FIGS. 11, 14, 15 and 16, the mid-section of container 100 has a generally flat, transverse rib or band 131. Band 131 extends around the top and bottom walls 111 and 112 and side walls 113 and 114. Band is continuous and has a generally flat surface around container 100. Generally flat, transverse grooves 132 and 133 are located on opposite sides of band 131. Grooves 132 and 133 separate band 131 from generally flat lower and upper bands 134 and 136. Lower rib 134 extends to bottom wall 117 and has ends that extend around the top and bottom walls 111 and 112 and side walls 113 and 114. Band 136 is joined with end wall 116 and has opposite ends that extend around the top and bottom walls 111 and 112 and side walls 113 and 114. Bands 131, 134 and 136, in conjunction with grooves 132 and 133, provide corrugated surfaces for the container which strength and stabilize the top and bottom walls 111 and 112, as well as the side walls 113 and 114 to minimize bulging and outward and inward movements of the walls which may be caused by liquids and gases and pressure differentials between chamber 118 of container 100 and atmosphere.

Referring to FIGS. 16 to 19, the lower portion of container 100 adjacent side wall 114 and lower end wall 117 has a second elongated, generally cylindrical handle 137. Handle 137 is joined to lower corners 144 and 146 of the top and bottom walls 111 and 112 respectively. The middle portion or span of handle 137 is spaced from a convex corner wall section 140, as shown in FIGS. 18 and 19, to provide an opening or recess 138 for accommodating a hand of a user to facilitate the manual manipulation and pouring of the container to pour a fluid from chamber 118 out of spout 128. Lower corners 144 and 146 prevent the hand from slipping off handle 137. Handle 137 is located diagonally opposite spout 128 and extends normal or transverse to the longitudinal plane of the first handle 124. The middle longitudinal plane of container 100 that passes through handle 124 bisects handle 137. In other words, handle 137 is normally disposed with respect to handle 124.

As shown in FIGS. 18 and 19, recess 138 is of a size to accommodate the fingers and hand 141. In FIG. 18, the hand 141 extends through lower or bottom opening 142 into recess 138 so as to firmly grip handle 137 in the palm-up or curl lift action. Referring to FIG. 19, hand 141 grips handle 137 and extends through a side entrance opening 143 into recess 138, so that the hand can grip the handle in the palm-down or reverse curl lift action. Lower corners 144 and 146 joined opposite ends of handle 137 enclose recess 136 so that the hand cannot slip off handle 137. This prevents the dropping of the container and inadvertent spilling of the fluids and fluid-like materials out of spout 128.

The fluid and fluid-like material is placed in the container by locating the container in the upright position, as shown in FIGS. 11 and 14. Cap 129 is removed from spout 128, thereby providing an opening into container chamber 118. When chamber 118 is full of fluid and fluid-like materials, cap 129 is threaded onto spout 128. The user will lift container 100 by grabbing handle 124 and transporting the container to a storage location. Cap 129 is removed from spout 128 when the contents of chamber 118 are to be poured from container 100. The user uses one hand to grip first handle 124. The other hand will grip second handle 137 either in the palm-up position, as shown in FIG. 18, or in the palm-down position, as shown in FIG. 19. Both hands are used to lift and rotate the containers so that the contents in chamber 118 can be poured from spout 128. The user has a positive grip on the first and second handles 124 and 137 which precludes the slippage of container 100 from the user, as well as inadvertent diversion of the fluid and fluid-like materials in chamber 118 as it is being poured through spout 128 to a selected location.

While there has been shown a described preferred embodiments of the container and its use of the invention, it is understood that changes in the materials, structures, and arrangement of structures may be made by those skilled in the art without departing from the invention. For example, the container preferably made of a durable plastic can be made of metal. The invention of the fluid collection container is defined in the following claims.

What is claimed is:

1. A container having an internal chamber for storing liquid comprising: wall means surrounding said chamber, said wall means including a side wall, a top end wall and a bottom end wall joined to the side wall, said bottom end wall being normally disposed relative to the side wall for supporting the container in an upright position on a support to store liquid in said chamber, a spout secured to the top end wall, said spout having an opening open to the chamber adapted to accommodate a removable cap for closing the opening, a first handle secured to the top end wall, said side wall and bottom end wall having laterally spaced corner sections diagonally opposite said spout, and a second handle extended between and secured to said laterally spaced corner sections, said second handle being spaced from the side wall and the bottom wall to provide a recess in said side wall and bottom wall under the second handle, said recess being opened adjacent to the side wall and open adjacent to the bottom wall to accommodate a person's hand from the side or bottom of the container to firmly grip said second handle, said first and second handles adapted to be gripped by both hands of a person to facilitate the handling of the container.

2. The container of claim 1 wherein: the first handle is normally disposed relative to the second handle.

3. The container of claim 1 wherein: the first handle has a middle section spaced from the wall means to provide an opening to accommodate one hand of a person to carry the container, said first handle being normally disposed relative to the second handle.

4. The container of claim 3 wherein: the first handle is located in a plane that bisects the second handle.

5. The container of claim 1 wherein: the side wall has a plurality of transverse ribs separated by transverse grooves.

6. The container of claim 5 wherein: said transverse ribs include a middle rib located generally in the central portion of the container.

7. The container of claim 1 wherein: the side wall includes a transverse rib around the lower portion of the wall means, said rib including the corner sections.

8. A container for storing liquid comprising: wall means providing a chamber for accommodating liquid, said wall means including a front wall, a back wall spaced from the front wall, a first side wall joined to the front and back wall, a second side wall joined to the front and back wall opposite the first side wall, a bottom wall joined to said front, back, and side walls, and a top wall joined to said front, back and side walls opposite the bottom wall, a spout secured to the top wall having a passage open to the chamber adapted to accommodate a removable cap for closing the opening, a first handle secured to the top wall, said front, back, bottom and one of the side walls having laterally spaced corner sections, a second handle extended between and secured to the corner sections, and a recess under the second handle open to said one of the side walls and bottom wall whereby the second handle can be gripped from the bottom or the side to facilitate the handling of the container.

9. The container of claim 8 wherein: the first handle is normally disposed relative to the second handle.

10. The container of claim 9 wherein: the first handle has a middle section spaced from the top wall providing an opening to accommodate one hand of a person to carry the container, said first handle being located in a plane that bisects the second handle.

11. The container of claim 8 wherein: the front, back and side walls have a plurality of transverse ribs separated by transverse grooves.

12. The container of claim 11 wherein: the transverse ribs include a middle rib located generally in the central portion of the container.

13. The container of claim 8 wherein: the wall means includes a transverse rib around the lower portion of the front, back and side walls, said rib including said corner sections.

14. The container of claim 8 wherein: the spout is secured to the top wall diagonally opposite the second handle.

15. The container of claim 8 wherein: the first handle is normally disposed relative to the second handle, said first handle having a mid-section spaced from the top wall providing an opening to accommodate one hand of a person to carry the container, said first handle being located in a plane that bisects the second handle, said wall means including a transverse rib around the lower portion of the front, back, and side walls, said rib including said corner sections.

16. The container of claim 15 wherein: said front, back and side walls have a plurality of transverse ribs separated with transverse grooves.

17. A container having an internal chamber for storing liquid comprising: wall means surrounding a chamber for accommodating liquid, said wall means including a side wall and a bottom end wall joined to the side wall, said bottom end wall being normally disposed relative to the side wall for supporting the container in an upright position on a support to store liquid in said chamber, a spout secured to the wall means spaced from said bottom end of wall, said spout having an opening open to the chamber adapted to accommodate a removable cap for closing the opening, a first handle secured to the wall means spaced from said bottom end wall, said side wall and bottom end wall having laterally spaced corner sections generally opposite said spout, and a second handle extended between and secured to said laterally spaced corner sections, said second handle being spaced from the side wall and the bottom wall to provide a recess in said side wall and bottom wall under the second handle, said recess being open adjacent to the side wall and open adjacent to the bottom wall to accommodate a person's hand from the side or bottom of the container to firmly grip said second handle, said first and second handles adapted to be gripped by both hands of a person to facilitate the handling of the container.

18. The container of claim 17 wherein: the first handle is normally disposed relative to the second handle.

19. The container of claim 17 wherein: the first handle has a middle section spaced from the wall means to provide an opening to accommodate one hand of a person to handle the container, said first handle being normally disposed relative to the second handle and located in a plan that bisects the second handle.

20. The container of claim 17 wherein: the side wall has a plurality of transverse ribs separated by transverse grooves.

* * * * *